(12) United States Patent
Swane (10) Patent No.: US 6,880,593 B1
(45) Date of Patent: Apr. 19, 2005

(54) FUEL FILL SYSTEM

(75) Inventor: Jeffrey A. Swane, Nixa, MO (US)

(73) Assignee: Dayco Products, LLC, Miamisburg, OH (US)

(*) Notice: Subject to any disclaimer, the term of this patent is extended or adjusted under 35 U.S.C. 154(b) by 117 days.

(21) Appl. No.: 10/732,861

(22) Filed: Dec. 10, 2003

(51) Int. Cl.$^7$ .................................................. B65B 1/04
(52) U.S. Cl. ........................................ 141/286; 220/86.2
(58) Field of Search .............................. 141/286, 301, 141/302, 349, 350; 220/86.2

(56) References Cited

U.S. PATENT DOCUMENTS

| | | | |
|---|---|---|---|
| 4,635,813 A | * 1/1987 | Peickert ..................... | 220/86.2 |
| 5,033,517 A | * 7/1991 | Bucci .......................... | 141/59 |
| 5,056,570 A | * 10/1991 | Harris et al. .................. | 141/59 |
| 5,415,316 A | 5/1995 | Pemberton et al. ......... | 220/562 |
| 5,947,153 A | 9/1999 | Bucci et al. ................ | 137/588 |
| 6,019,348 A | * 2/2000 | Powell ........................ | 251/144 |
| 6,074,717 A | 6/2000 | Little et al. ................. | 428/35.7 |
| 6,260,578 B1 | 7/2001 | Kuehnemund et al. ..... | 137/592 |
| 6,293,312 B1 | 9/2001 | Stripe ......................... | 138/141 |
| 6,591,871 B1 | 7/2003 | Smith et al. ................ | 138/137 |
| 2001/0018485 A1 | 8/2001 | Matsuoka et al. .......... | 524/492 |
| 2002/0059954 A1 | 5/2002 | Aoki et al. ................. | 137/202 |

* cited by examiner

*Primary Examiner*—Steven O. Douglas
(74) *Attorney, Agent, or Firm*—Joseph V. Tassone; Wiggin & Dana LLP (57) ABSTRACT

A fuel fill system includes an outer funnel and one or more components, each formed from a thermoplastic material. The components, which may include a flange, a tube, and a vapor recirculation fitting, are in fluid communication with the outer funnel via welded joints. The welded joints may be formed by at least one of: spin welding, hot plate welding, laser welding, vibration welding, and ultrasonic welding. The plastic to plastic weld provides an electrically conductive, substantially seamless, vapor permeation resistant joint between each of the components and the outer funnel.

25 Claims, 8 Drawing Sheets

FUEL FILL SYSTEM

BACKGROUND

This invention relates to fuel fill systems in motor vehicles. Fuel fill systems are found in motor vehicles such as automobiles, trucks, boats, airplanes, and the like, and serve to transfer fuel provided by a source external to the vehicle (e.g., a gas pump) to a fuel storage tank located in the vehicle. In general, fuel fill systems include a funnel assembly, called a fuel filler neck, connected to the fuel storage tank by one or more lengths of tube. The fuel filer neck receives fuel delivered from the external fuel source, and the one or more lengths of tube deliver the fuel to the fuel storage tank. A removable cap (e.g., a gas cap) is secured to the fuel filler neck to seal the fuel fill system after the fueling process.

In a typical fuel fill system, each of the one or more tubes are joined to the fuel filler neck by a press-fit joint, which is formed by sliding the tube over a hollow cylindrical projection on the fuel filler neck. The tube is secured in-place by a barb formed on the projection. A mechanical fastener (e.g., a hose clamp) may also be used to seal the hose to the projection.

Recent environmental regulations imposed on the automotive industry and on the fuel delivery industries severely limit the amount of fuel vapor that can permeate from the fuel fill system of motor vehicles. To help meet and exceed these regulations, various improvements in technology have been developed. For example, various types of vapor permeation resistant tubing have been proposed to limit the amount of fuel vapor that can permeate from the system through the tubing. Examples of such tubing are provided in U.S. Pat. No. 6,591,871, entitled "Low Permeation Polybutylene Terephthalate and Polybutylene Naphthalate Fuel and Vapor Tubes"; and in U.S. Pat. No. 6,293,312, entitled "Thermoplastic Tubing".

In addition to advancements in the materials used in fuel fill systems, advancements have been made in the design of fuel fill systems. One example of an advancement in the design of fuel fill systems is found in so-called On-Board Refueling Vapor Recovery (ORVR) equipped fuel fill systems. ORVR equipped fuel fill systems include a vapor recirculation tube, which provides a separate fluid path between the fuel storage tank and the fuel filler neck. The recirculation tube provides a path for receiving the air/fuel vapor displaced from the fuel storage tank during fueling, and reintroduces the displaced air/fuel vapor to the fuel filler neck.

While innovations such as vapor permeation resistant tubing and ORVR equipped systems significantly reduce the amount of fuel vapor that is allowed to escape from a fuel fill system, further reductions are desired.

BRIEF SUMMARY OF THE INVENTION

The above-described and other drawbacks and deficiencies of the prior art are overcome or alleviated by a fuel fill system including an outer funnel and one or more components, each of which is formed from a thermoplastic material. Each component is in fluid communication with the outer funnel via a welded joint. The one or more components include at least one of a flange, a tube, and a vapor recirculation fitting. The weld may be formed by at least one of: spin welding, hot plate welding, laser welding, vibration welding, and ultrasonic welding. The plastic outer funnel may be formed from an electrically conductive thermoplastic material.

In one embodiment, an inner funnel is disposed within the outer funnel. The inner funnel is secured within the outer funnel by the flange, where the flange is welded to the outer funnel. A means for preventing axial rotation of the inner funnel within the outer funnel during the welding process may be provided. The outer funnel may include an alignment feature disposed thereon, which cooperates with alignment features on the components to ensure proper alignment of the components relative to the outer funnel.

To form the weld, either the outer funnel or the component may include a cylindrical protrusion extending therefrom, with the weld being formed on either the inner circumference or the outer circumference of the cylindrical protrusion. Alternatively, either the outer funnel or the component may include an annular recess disposed therein. The weld is formed on opposing surfaces forming the annular recess.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

The invention will be more fully understood from the following detailed description taken in conjunction with the accompanying drawings wherein like elements are numbered alike, and in which.

DETAILED DESCRIPTION

Figure 1:
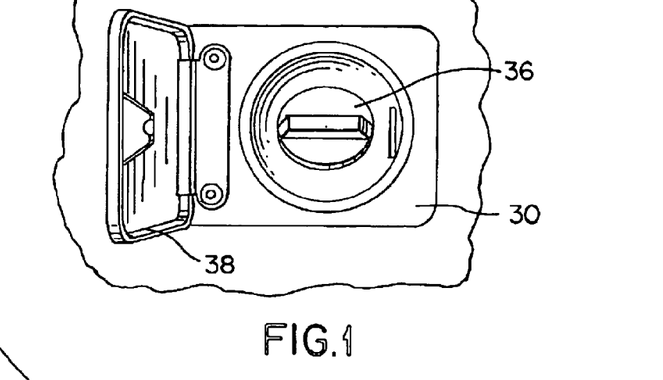
FIG. 1 is a side elevation view of a portion of a fuel fill system in a motor vehicle.

FIG. 1 is a side elevation view of a portion of a fuel fill system 10 in a motor vehicle such as an automobile, truck, boat, airplane, and the like. The fuel fill system 10 includes a fuel filler neck 12, which includes an outer funnel 14, and one or more components 18 attached to the outer funnel 14 by joints 16 that allow fuel or fuel vapor to be communicated between the outer funnel and the components 18. The one or more components 18 may include a flange 20, a tube 22, and a vapor recirculation fitting 24. The outer funnel 14 and the components 18 are formed from a thermoplastic material, and the joint 16 between each of the components 18 and the outer funnel 14 is formed by welding the component 18 to the outer funnel 14. As will be described in further detail hereinafter, the weld may be formed by spin welding, hot plate welding, laser welding, vibration welding, or ultrasonic welding. Advantageously, the plastic to plastic weld formed between the one or more components 18 and the outer funnel 14 provides a permanent, seamless, and vapor permeation resistant joint 16. It has also been surprisingly found that the welded joint 16 may be electrically conductive.

The flange 20 includes a shoulder 26 extending around the perimeter of a hollow, generally cylindrical structure 28. The shoulder 26 abuts against a portion of a body 30 of the motor vehicle for supporting the fuel filler neck against the body 30. The flange 20 may be secured to the body 30 by fasteners 32 disposed through the shoulder 26.

Figure 2:
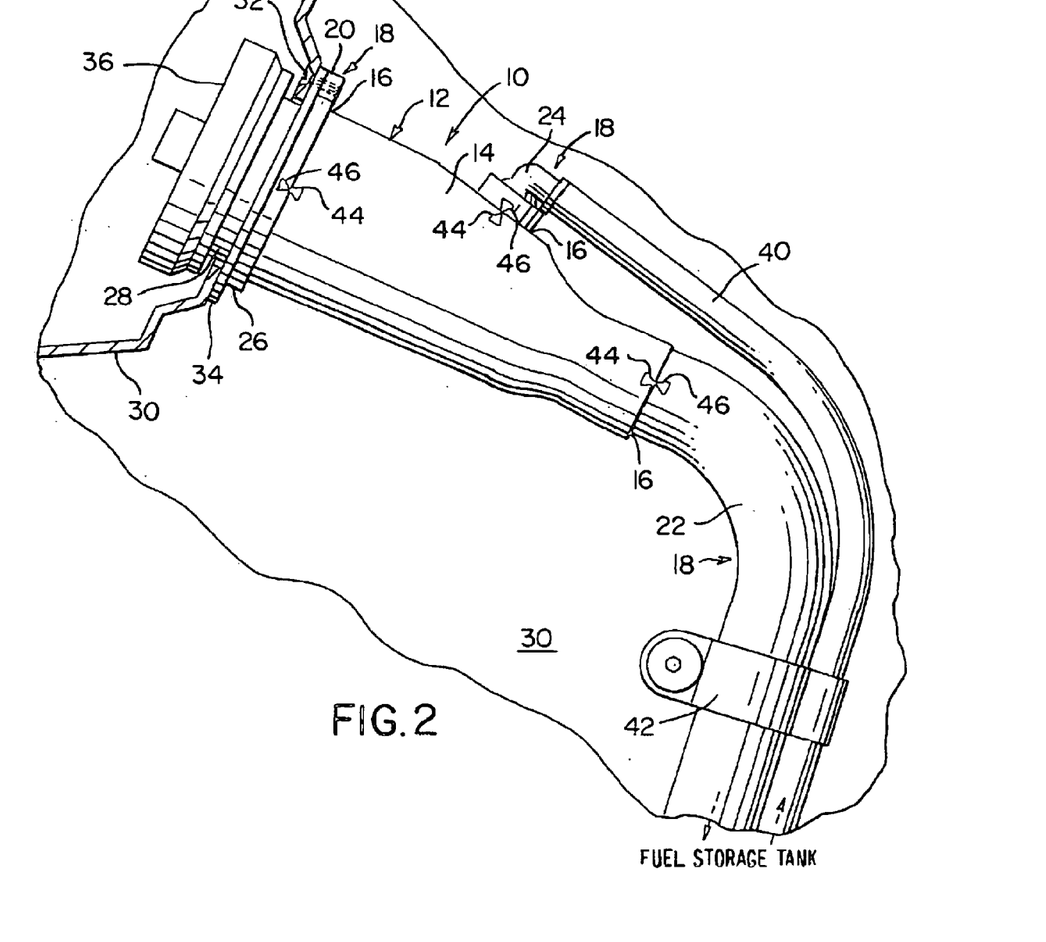
FIG. 2 is a front elevation view of a portion of the fuel fill system.

A removable cap 36 (e.g., a gas cap) is secured to the fuel filler neck 12 so that the fuel fill system 10 may be sealed. A collar 34 may be disposed around a distal end of the cylindrical structure 28 to resiliently seal the fuel filler neck 12 to the body 30 of the vehicle. FIG. 2 shows a front view of the removable cap 36 and collar 34 as they may appear from the outside of the vehicle. The view of FIG. 2 also shows a fuel door 38 secured by hinges to the body 30 of the motor vehicle, as is typically found in motor vehicles for covering the removable cap 36.

Referring again to FIG. 1, the vapor recirculation fitting 24 is coupled to a vapor recirculation tube 40, which has a smaller diameter than the tube 22. Both the tube 22 and the vapor recirculation tube 40 are connected in fluid communication between the fuel filler neck 12 and a fuel storage tank in the motor vehicle. The tube 22 and the vapor recirculation tube 40 may be secured to the body 30 of the motor vehicle by one or more mounting brackets 42.

The outer funnel 14 may include one or more alignment features 44 disposed thereon. The alignment features 44 on the funnel cooperate with corresponding alignment features 46 on the components 18 to ensure that the components 18 are properly aligned with the outer funnel 14 during the welding process.

The outer funnel 14, flange 20, tube 22 and vapor recirculation fitting 24 are preferably made from a vapor permeation resistant thermoplastic, such as acetals, nylon, fluoropolymers and the like. The tube 22 may be formed from composites or multiple layers of thermoplastic materials, such as, for example, a fluoropolymer tube with a nylon cover. The tube 22 may also include a metallic barrier layer disposed between an inner thermoplastic layer and an outer thermoplastic layer, as described in commonly owned U.S. patent application Ser. No. 10/732,841 to Mobley et al., filed Dec. 10, 2003 and entitled "Gas Impermeable Tube Joint and Method of Forming Same", which is incorporated by reference herein in its entirety. The use of a tube 22 having a metallic barrier layer would allow the tube 22 and the joint between the tube 22 and the fuel filler neck 12 to be substantially gas impermeable.

In addition, any of the tube 22, the flange 20, the outer funnel 14, and the vapor recirculation fitting 24 may be made from an electrically conductive thermoplastic material such as, for example, carbon fibril filled nylon 12, or other formulations made from acetal, nylon, flouropolymer and the like with conductive additives such as carbon black, nickel coated graphite, milled carbon fiber and the like. It has been surprisingly found that, where the components 18 and the outer funnel 12 are made from an electrically conductive thermoplastic material, the welded joint 16 formed between the components 18 and the outer funnel 12 are also electrically conductive. As a result, the components 18 and outer funnel 12 of the fuel fill system 10 may be commonly grounded to dissipate any static electricity generated during the fuel filling process.

In operation, the fuelling process typically includes removing the cap 36 and inserting a nozzle from an external fuel source (e.g., a fuel pump) into the fuel filler neck 12. Fuel is then pumped through the fuel filler neck 12 and tube 22 to the fuel storage tank. The vapor recirculation tube 40 provides a path for receiving the air/fuel vapor displaced from the fuel storage tank during fueling, and reintroduces the displaced air/fuel vapor to the fuel filler neck 12 via the vapor recirculation fitting 24. After the fuelling process is complete, the nozzle is removed from the fuel filler neck 12 and the cap 36 is replaced.

Figure 3:
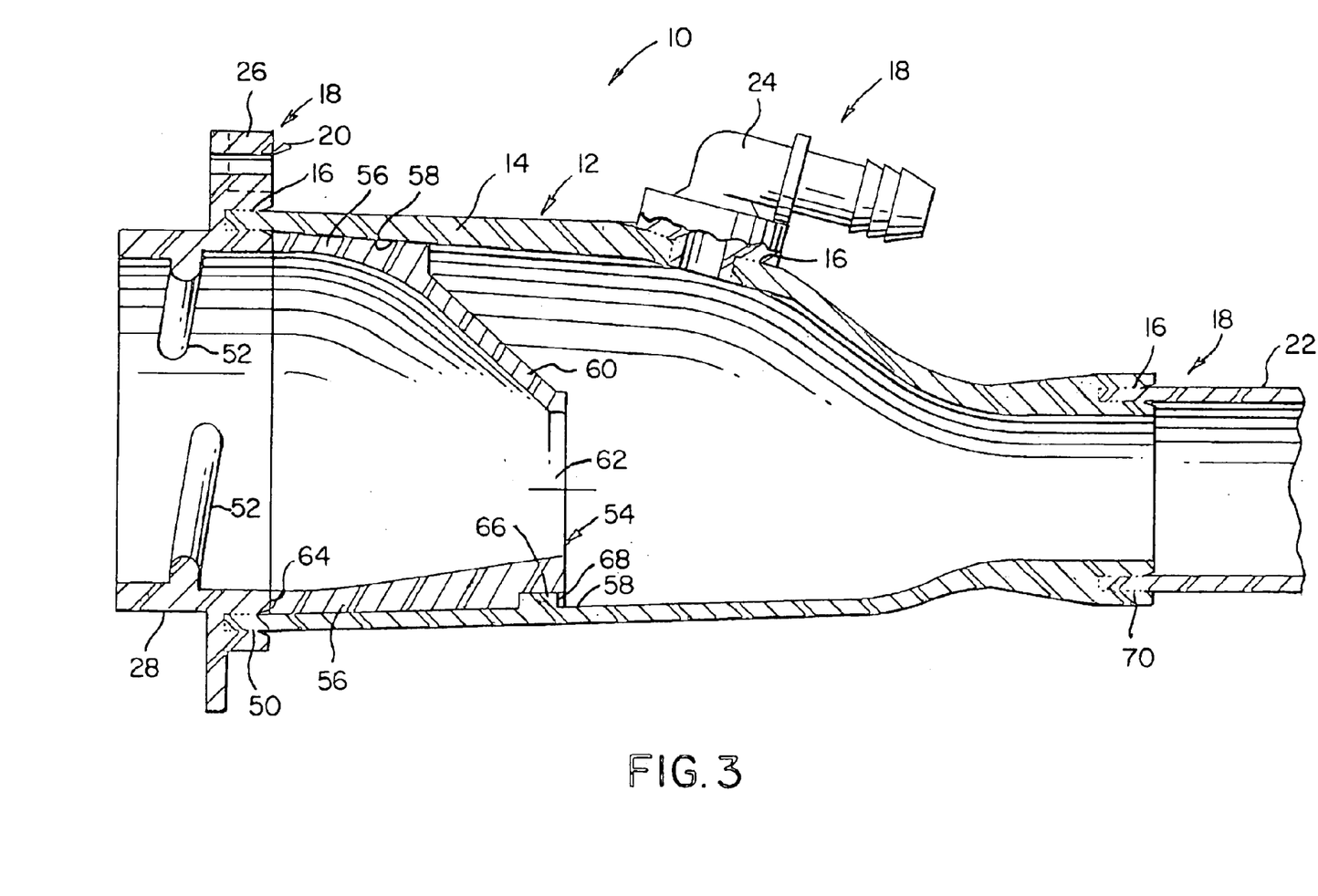
FIG. 3 is a cross-sectional view of a fuel filler neck of the fuel fill system.

Referring to FIG. 3, a partial cross-sectional view of the outer funnel 14, flange 20, tube 22, and vapor recirculation fitting 24 is shown, revealing the welded joints 16 formed between the outer funnel 14 and these various components 18. The flange 20 includes an annular recess 50 disposed therein, which receives an end of the outer funnel 14. The welded joint 16 between the outer funnel 14 and the flange 20 is formed within the annular recess 50. Disposed on an inner surface of the cylindrical structure 28 of the flange 20 are threads 52, which accept mating threads on the cap 36 (FIG. 1) for securing the cap 36 to the fuel filler neck 12.

Disposed within the outer funnel 14, and forming part of the fuel filler neck 12, is an inner funnel 54. The inner funnel 54 includes a generally cylindrical portion 56, the outer surface of which is shaped to conform to an inner surface 58 of the outer funnel 14. Extending from the generally cylindrical portion 56 is a generally conical portion 60, which terminates at an aperture 62. The aperture 62 is sized to receive the nozzle from the external fuel source. The inner funnel 54 fits snugly within the outer funnel 14, but is preferably not fastened or welded thereto. Instead, an end surface of the generally cylindrical portion 56 abuts against a shoulder 64 formed on the flange 20, and, because the flange 20 is welded to the outer funnel 14, the shoulder 64 secures the inner funnel 54 within the outer funnel 14. A protrusion 66 extending from the outer funnel 14 is received within a corresponding recess 68 formed in the inner funnel 54 to prevent axial rotation of the inner funnel 54 within the outer funnel 14. Other means for preventing axial rotation of the inner funnel 54 within the outer funnel 14 may also be employed. For example, the outer funnel 14, inner funnel 54, and/or the flange 20 may include cooperating protrusions and recesses, or the inner surface 58 of the outer funnel 14 and the generally cylindrical portion 56 of the inner funnel 54 may have a shape other than generally cylindrical (e.g., angular shaped, oval shaped, and the like).

In the embodiment of FIG. 3, the outer funnel 14 includes an annular recess 70 disposed therein, which receives an end of the tube 22. The welded joint 16 between the outer funnel 14 and the tube 22 is formed within the annular recess 70.

Figure 4:
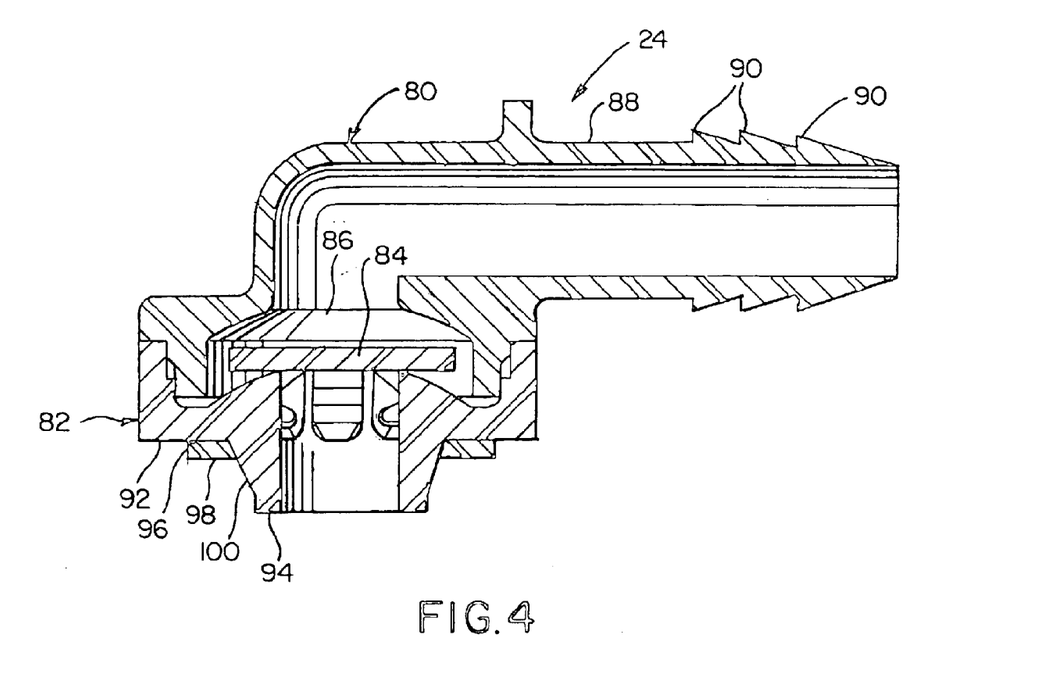
FIG. 4 is a cross-sectional view of a vapor recirculation valve of the fuel fill system.

Referring to FIG. 4, a cross-sectional view of the vapor recirculation fitting 24 is shown. In this embodiment, the vapor recirculation fitting 24 includes an upper body portion 80, which is shaped to receive the vapor recirculation tube 40 (FIG. 1), and a lower body portion 82, which shaped for welding to the outer funnel 14 (FIG. 1). The upper body portion 80 of the vapor recirculation fitting 24 includes a hollow cylindrical projection 88 having barbs 90 formed thereon. The vapor recirculation tube 40 (FIG. 1) is joined to the vapor recirculation fitting 24 by sliding the tube 40 over the projection 88 and barbs 90. A mechanical fastener (e.g., a hose clamp) may also be used to seal the tube 40 to the vapor recirculation fitting 24.

Disposed between the upper and lower body portions 80 and 82 is a valve disc 84, which interacts with a seating surface 86 disposed on the upper body portion 80 to allow the flow of vapor from the fuel storage tank to the fuel filler neck 12, as shown in FIG. 1, while checking the flow of fuel from the fuel filler neck 12 to the fuel storage tank via the vapor recirculation tube 40. While the vapor recirculation fitting 24 is shown here to include a check valve, the vapor recirculation fitting 24 may be any fitting that couples the vapor recirculation tube 40 to the fuel filler neck 12.

The lower body portion 82 of the vapor recirculation fitting 24 is shaped to allow the plastic to plastic welding of the vapor recirculation fitting 24 to the outer funnel 14 (FIG. 1). The lower body portion 82 includes a planar face 92 and a hollow protrusion 94 extending perpendicularly from the face 92. Disposed around the protrusion 94 is a shoulder 96 having a surface 98 generally parallel to and spaced apart from the face 92. The protrusion 94 is tapered to provide an angular surface 100 that intersects with the surface 98 of the shoulder 96. The dimensions are sized relative to the circular apeture 102 (FIG. 5) in outer funnel 14 to allow sufficient interference to produce a permeation free joint.

Figures 5, 6, 7, 8:
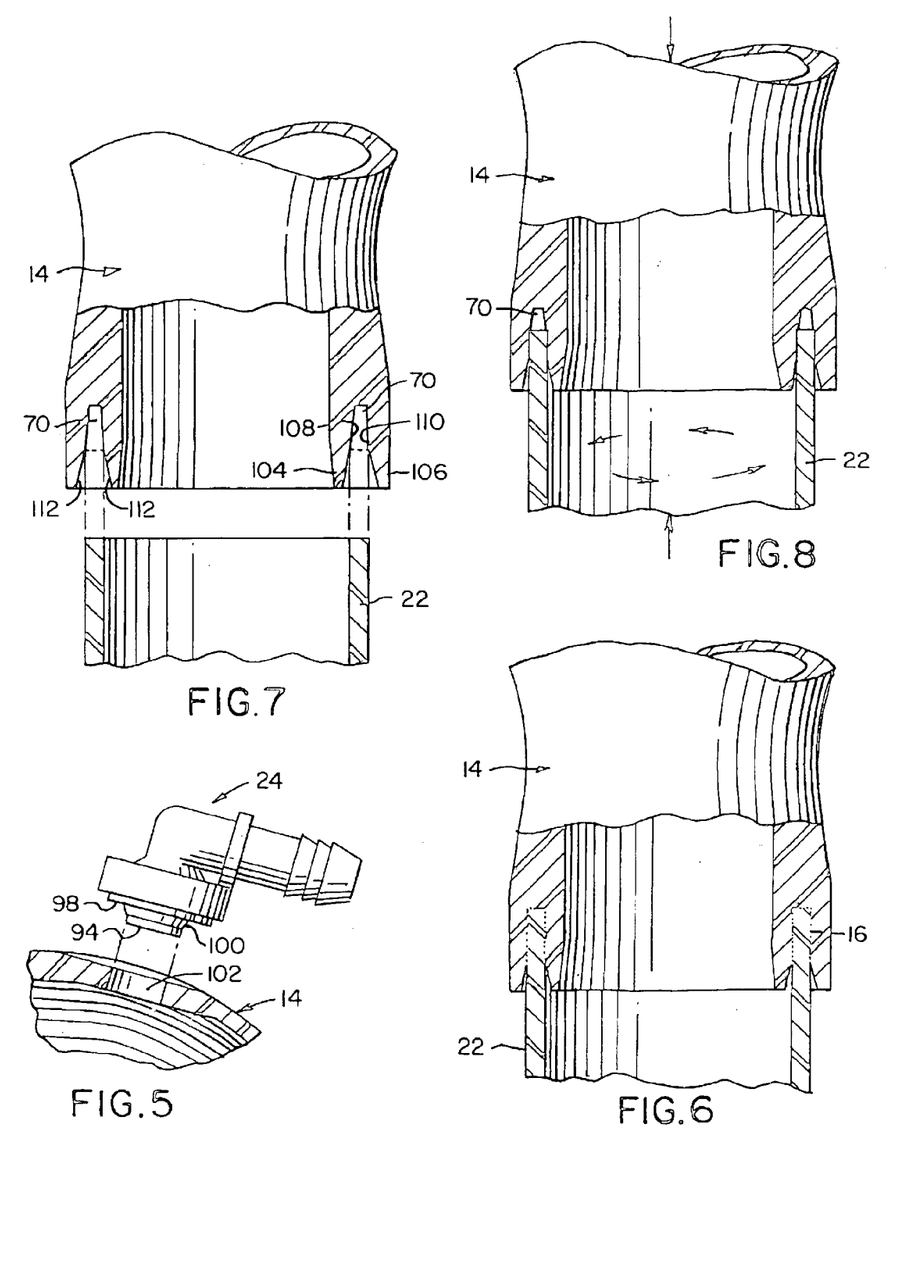
FIG. 5 is a cross-sectional view of a portion of the fuel filler neck showing insertion of the recirculation valve.
FIG. 6 is a partial cross-sectional view of a welded joint between an outer funnel and a tube.
FIG. 7 is a partial cross-sectional view of an end of the tube separated from the outer funnel before welding.
FIG. 8 is a partial cross-sectional view of an end of the tube forced onto the outer funnel before welding.

Referring to FIG. 5, the vapor recirculation fitting 24 is shown removed from the outer funnel 14, before welding. The outer funnel 14 includes a circular aperture 102 disposed therein for receiving a distal end of the protrusion 94. Referring to FIGS. 4 and 5, insertion of the protrusion 94 into the aperture 102 causes the angled surface 100 to come into contact with the edge of the aperture 102 to provide an interference fit. The welded joint 16 (FIG. 1) is formed between the outer funnel 14 and both the angled surface 100 and the shoulder surface 98 of the vapor recirculation fitting 24 using either a frictional method or an external heat source method, which are described hereinafter with reference to FIGS. 12 and 13.

FIGS. 6–8 depict portions of the tube 22 and outer funnel 14 in various stages of the welding process. FIG. 6 depicts a partial cross-sectional view of the welded joint 16 between the tube 22 and the outer funnel 14. As previously noted, the complete welded joint 16 between the the tube 22 and outer funnel 14 is formed within the annular recess 70. FIGS. 7 and 8 depict the tube 22 and outer funnel 14 before welding, with FIG. 7 showing the tube 22 and outer funnel 14 separated, and FIG. 8 showing the tube 22 and outer funnel 14 forced together. While FIGS. 6–8 depict the annular recess 70 as being disposed in the outer funnel 14 for receiving the end of the tube 22, it is within the scope of the invention that the tube 22 may be shaped to include an annular recess for receiving an end of the funnel 14.

The annular recess 70 is formed between an inner protrusion 104 and outer protrusion 106, which extend outward from the outer funnel 14. More specifically, the annular recess is formed between an outer surface 108 of the inner protrusion, and an inner surface 110 of the outer protrusion 106. The annular recess 70 is dimensioned to receive a portion of the end of the tube 22, as shown in FIG. 8. The inner and outer surfaces 110, 108 are angled relative to each other such that the end of the tube 22 forms an interference fit within the recess 70 when forced therein. A relief cut 112 may be provided at the inlet end of the annular recess 70 to ease insertion of the end of the tube 22 into the recess 70. The welded joint 16 is formed between the inner and outer surfaces 110, 108 and side surfaces of the tube 22 using either a frictional method or an external heat source method, which are described hereinafter with reference to FIGS. 12 and 13.

Figure 9:
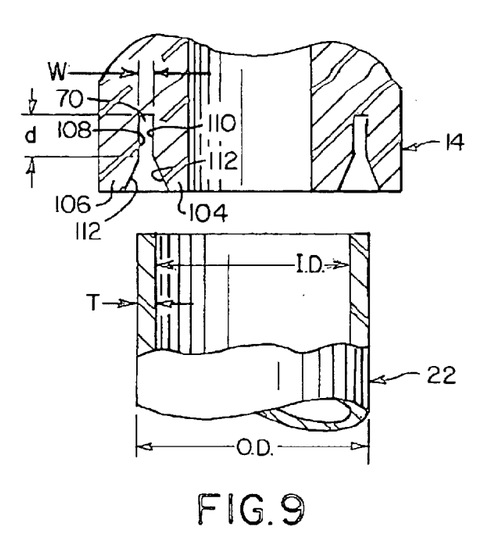
FIG. 9 is a cross-sectional view of the end of the tube separated from the outer funnel showing various dimensions of the tube and the outer funnel.

FIG. 9 is a cross-sectional view of the end of the tube 22 separated from the outer funnel 14 showing various dimensions of the tube 22 and the outer funnel 14. The outside diameter (O.D.) and inside diameter (I.D.) of the tube 22 are selected based on the particular application. The recess 70 has a depth "d". The depth "d" of the recess 70 may be used to control the length of the tube 22 that is welded to the outer funnel. As a result, the depth "d" of the recess may be used to control the strength of the joint 16 (FIG. 1) as necessary to meet system requirements. The width "w" of the recess 70, as well as the outside diameter of the inner protrusion 104 and the inside diameter of the outer protrusion 106, may be selected in relation to the dimensions of the tube 22 to determine which of the surfaces on the tube and the inner and/or outer protrusion 104, 106 will form the welded joint 16. In a preferred embodiment, these various dimensions are selected such that the inner surface of the tube 22 contacts the outer surface 108 of the inner protrusion 104, and the outer surface of the tube 22 contacts the inner surface 110 of the outer protrusion 106, as shown in FIG. 8. As a result, both the inner and outer surfaces of the tube 22 will form the weld with the outer funnel 14.

In one example of the preferred embodiment, the depth "d" of the recess 70 may be about two to about three times the total thickness "T" of the tube 22, with the width "w" of the recess 70 being about 0.01 inch to about 0.02 inches less than the total thickness "T". Preferably, the surfaces 108 and 110 are angled relative to each other to provide an included angle of about 1° to about 3°. Where the surfaces 108 and 110 are angled, the width "w" represents the minimum width of the recess 70. The total thickness "T" of the tube 22 may be between about 0.05 inches to about 0.08 inches and the I.D. of the tube may be about 1 inch.

Figure 10:
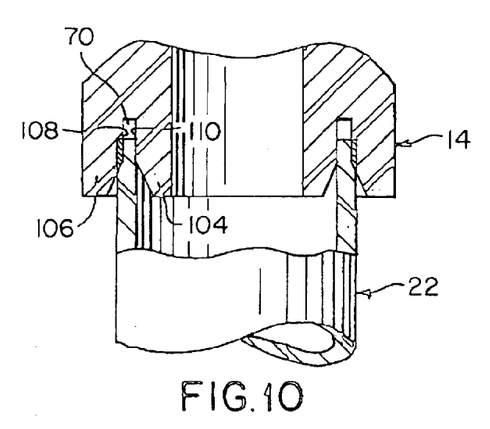
FIG. 10 is a partial cross-sectional view of an end of the tube forced onto the outer funnel in accordance with another embodiment of the invention.

FIG. 10 depicts an embodiment where the weld is formed only between the outer surface of the tube 22 and the inner surface 108 of the outer protrusion 106. In this embodiment, the inner protrusion 104 provides internal support to the tube 22, but is not welded to the tube 22. It is contemplated that the outer funnel 14 may be formed without the inner protrusion 104, such that the recess 70 is formed only by the inner surface 108.

Figure 11:
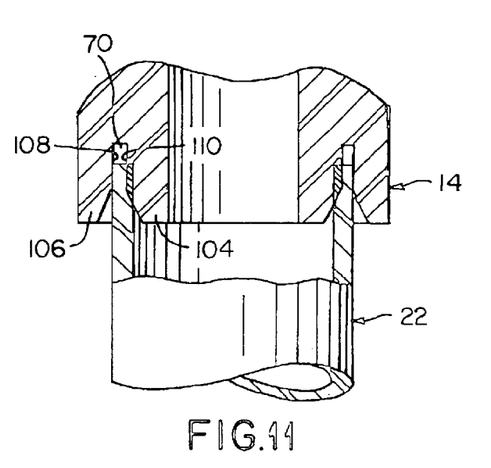
FIG. 11 is a partial cross-sectional view of an end of the tube forced onto the outer funnel in accordance with yet another embodiment of the invention.

FIG. 11 depicts an embodiment where the weld is formed only between the inner surface of the tube 22 and the outer surface 110 of the inner protrusion 104. In this embodiment, the outer protrusion 106 provides external support to the tube 22, but is not welded to the tube 22. It is contemplated that the outer funnel 14 may be formed without the outer protrusion 106.

The annular recess 50 (FIG. 1) formed in the flange 20, and the welded joint 16 formed therein, is substantially similar to the welded joint 16 formed between the tube 22 and the outer funnel 14. As a result, any of the embodiments discussed with reference to the joint 16 between the tube 22 and the outer funnel 14 are equally applicable to the joint 16 between the flange 20 and the outer funnel 14.

Figure 12:
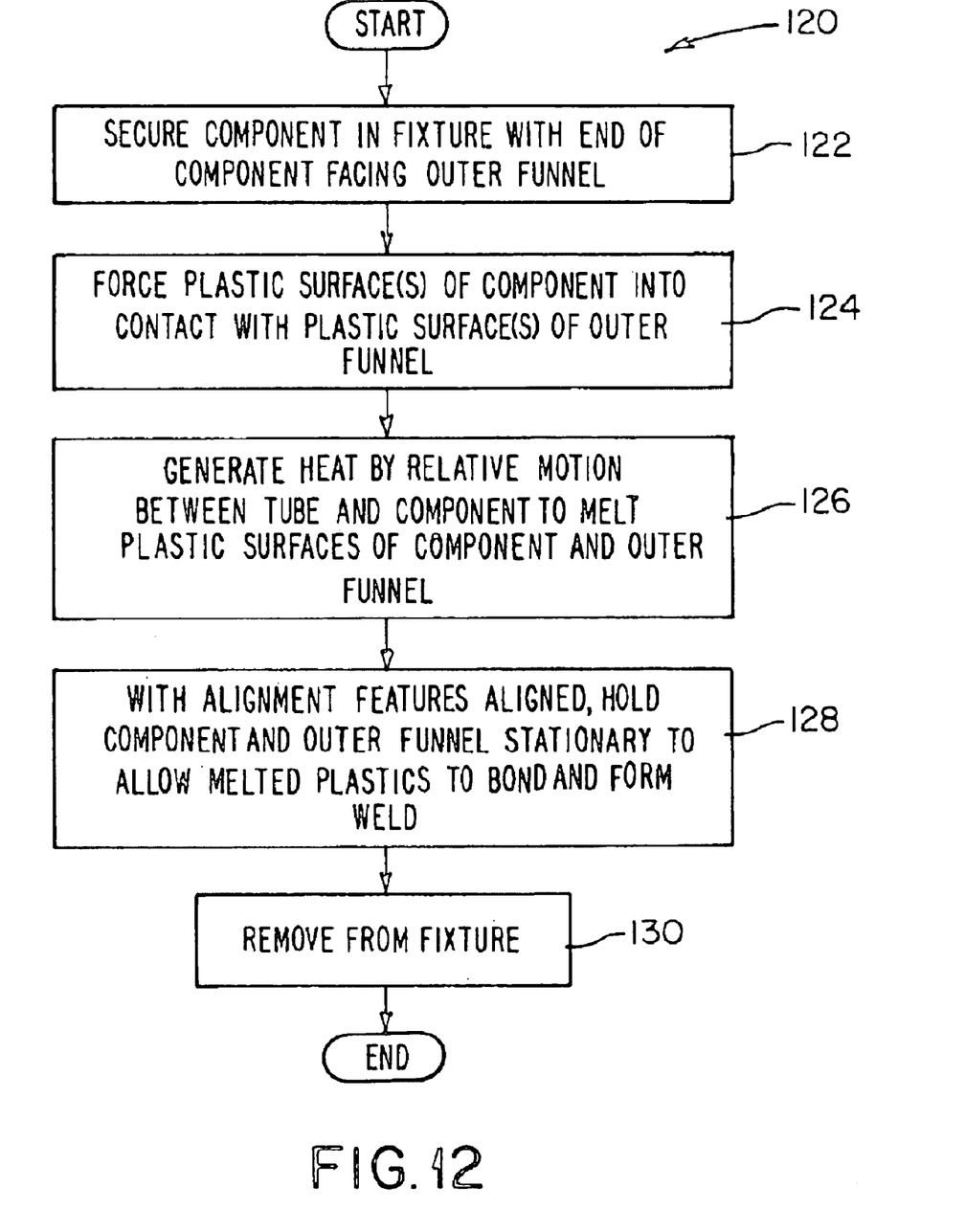
FIG. 12 is a flow chart depicting a method of forming a permeation resistant welded joint.

FIG. 12 is a flow chart depicting a method 120 of forming each joint 16 between the various components 18 (e.g., the flange 20, the vapor recirculation fitting 24, and the tube 22) and the outer funnel 14. Referring to FIGS. 1–12, the method 120 can be described. With the component 18 separated from the outer funnel 14 (e.g., as shown in FIGS. 5 and 7) the component 18 is secured in a fixture with the end of the component 18 facing the component 16 (block 122 of method 120). If the component 18 to be installed is the flange 20, the inner funnel 54 is inserted into the outer funnel 14 before welding. Next, the component 18 is forced onto the outer funnel 14 such that the one or more plastic surfaces on the component come into contact with the plastic surface of the outer funnel 14 (block 124). The plastic surface(s) of the component 18 are then moved relative to the plastic surface of the outer funnel 14 to create frictional heat (block 126). The relative motion may be created by spinning, vibration, ultrasound, or any other convenient method that results in melting of the plastic surfaces. During this step, the inner funnel 54 is held stationary within the outer funnel 14 by the protrusion 66 or other such means. After the plastic surfaces have melted, the alignment features 44 and 46 on the component 18 and the outer funnel 14 are aligned, and relative motion is stopped. The component 18 and outer funnel 14 are then held stationary to allow the melted plastics to bond and form the welded joint 18 (block 128), after which the fixture may be removed (block 130). This process is repeated for each component 18 to be attached to the outer funnel 14.

The method 120 requires that the melting temperature of the material used to form the weld surface(s) of the component 18 is sufficiently close to the melting temperature of the material used to form the weld surface of the outer funnel 14 so that all of the materials forming the weld are melted by the friction welding process. Preferably, the melting temperatures the materials are within ±20° F. of each other, and more preferably, the same material is used on both the component 18 and the outer funnel 14 so that the melting temperatures are the same.

Using method 120, several sample fuel filler necks 12 were assembled in accordance with the embodiment of FIGS. 1–9. In these samples, the outer funnel 14, flange 20, vapor recirculation fitting 24, and tube 22 were formed from nylon 12 or polyethylene, and spin welding was used to form the welded joints 16. The spin welding process was performed by spinning each component 18 at about 1000 to 1500 rotations per minute (RPM) while applying about 30 to 35 psi pressure on the component 18 for about 15 to 25 revolutions. Visual inspection and pressure testing of each welded joint 16 showed the welded joints to be seamless and resistant to the permeation of gas. Electrical resistance testing of each welded joint 16 showed the welded joints 16 to be electrically conductive.

Figure 13:
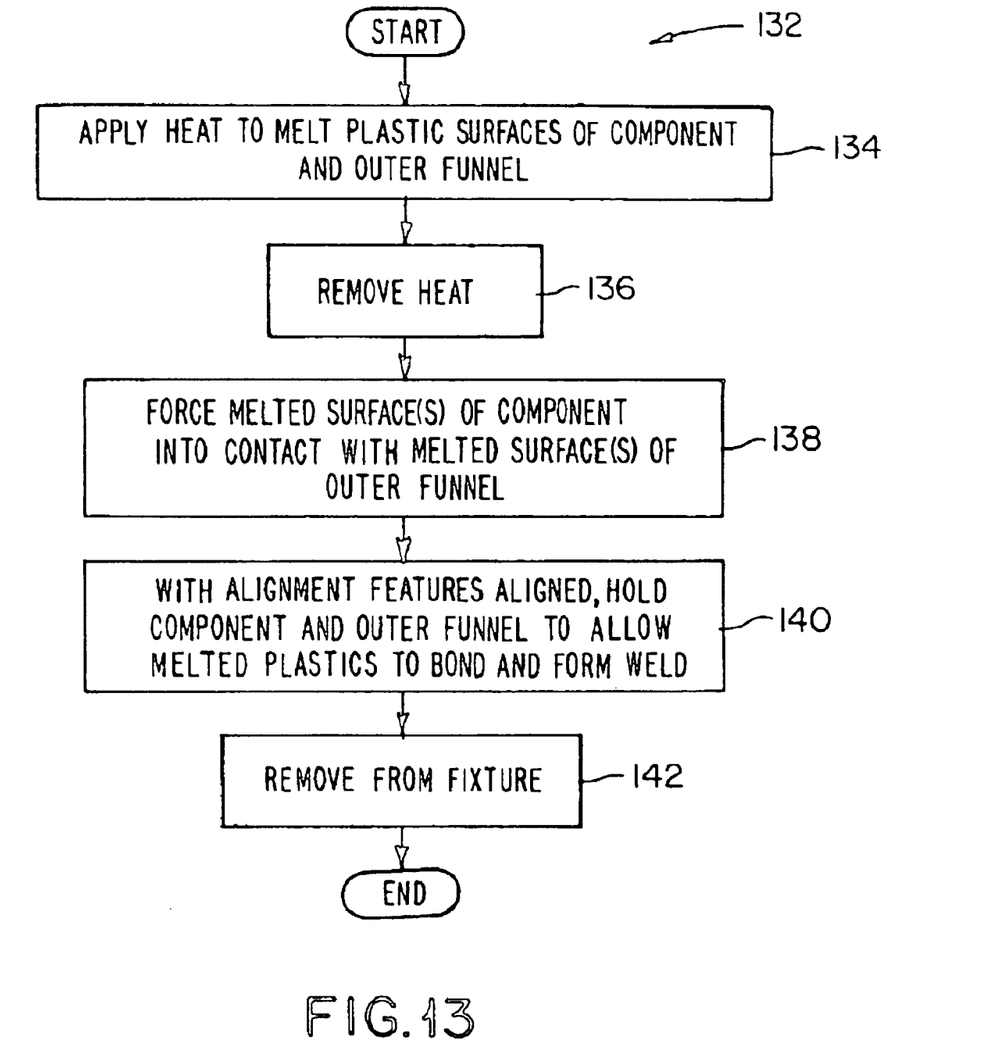
FIG. 13 is a flow chart depicting an alternative method of forming the permeation resistant welded joint.

FIG. 13 is a flow chart depicting an alternative method 132 of forming the welded joints 16 between the various components 18 (e.g., the flange 20, the vapor recirculation fitting 24, and the tube 22) and the outer funnel 14. Unlike the method 120 of FIG. 12, which uses friction to generate the heat required for welding, the method 132 of FIG. 13 uses an external source of heat (e.g., a hot plate, laser or the like) to melt the plastic surfaces to be welded. As a result, the method 132 of FIG. 13 may be used where the plastic material used in the component 18 has a substantially different melting temperature than the plastic material used in the outer funnel 14. In method 132, the external source of heat is first applied to melt the plastic surfaces to be welded (block 134 of method 132). If the component to be installed is the flange 20, the inner funnel 54 is preferably inserted into the outer funnel 14 before heating the surfaces. After the plastic surfaces on the component 18 and outer funnel 14 are melted, the external source of heat is then removed (block 136) and the melted surfaces are forced against each other (block 138). With the alignment features 44 and 46 aligned, the component 18 and the outer funnel 14 are held stationary within a fixture to allow the melted plastics to bond and form the welded joint 16 (block 140), after which the tube 22 and component 18 are removed from the fixture (block 142).

FIGS. 14–19 depict various alternative arrangements for the joints 16 between the various components 18 and the outer funnel 14. Each of FIGS. 14–19 depict the component 18 and outer funnel 14 before welding, when the component 18 is forced against the outer funnel 14. For purposes of description, the various alternative arrangements in FIGS. 14–19 are described with reference to the tube 22 and the outer funnel 14. It is contemplated that these alternative arrangements may also be used for forming the joints 16 between the other components 18 and the outer funnel 14. These arrangements have been found to be especially well suited for use where the joints 16 are formed by spin welding.

Figure 14:
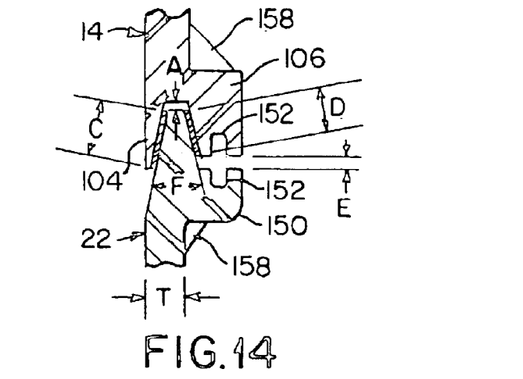
FIG. 14 is a cross-sectional view of a first alternative arrangement of the tube and fuel filler neck before welding.
Figure 15:
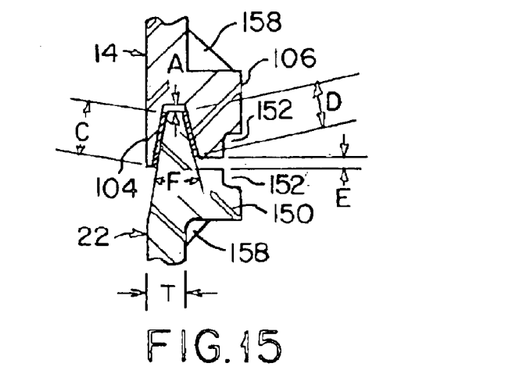
FIG. 15 is a cross-sectional view of a second alternative arrangement of the tube and fuel filler neck before welding.
Figure 16:
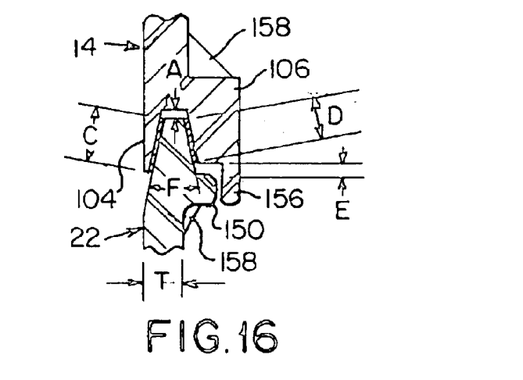
FIG. 16 is a cross-sectional view of a third alternative arrangement of the tube and fuel filler neck before welding.

In each of FIGS. 14–16, the weld is formed on the inner and outer surfaces of the tube 22. Unlike the straight-walled tube 22 used in the embodiment described with reference to FIGS. 6–11, the end of the tube 22 used in the arrangements of FIGS. 14–16 is shaped to have an included angle "F" between the inner surface "C" and the outer surface "D" of the tube 22. The included angle "F" is preferably between about 20° to about 40°, and more preferably between about 25° to 30°. The arrangements of FIGS. 14–16 are also shown to include various is shoulders 150 disposed on the tube 22.

In FIGS. 14–16, the total thickness of the tube 22 is indicated at "T". Preferably, the surface area of the tube 22 contacting the inner and outer protrusions (C+D) is equal to about 1.5×T to about 3.5×T, and more preferably between about 1×T to 2×T. The depth of the weld, as indicated at "A", is preferably between about 0.3×T to about 1.0×T, and more preferably between about 0.5×T to about 0.8×T. As discussed above, the welded surface may be increased or decreased depending on the required strength of the weld, among other variables.

Figure 17:
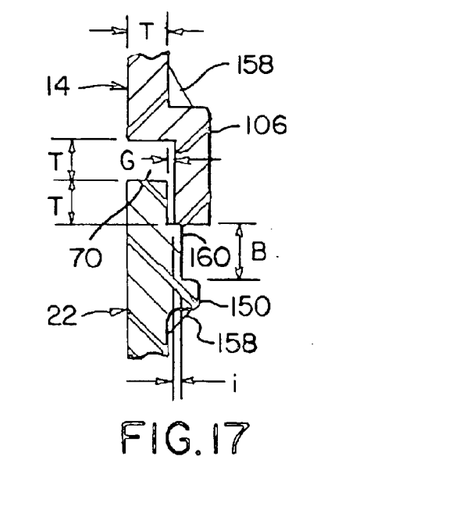
FIG. 17 is a cross-sectional view of a fourth alternative arrangement of the tube and fuel filler neck before welding.

Each of the arrangements in FIGS. 15–17 include a shoulder 150 protruding radially outward around the outer surface of the tube 22. With the tube 22 and outer funnel 14 forced together prior to welding, the shoulder 150 is preferably separated from the outer protrusion 106 by a distance "E", which is preferably equal to the depth of the weld "A" plus about 0.01 inch. The shoulder 150 prevents the tube 22 from extending within the outer flange 14 substantially beyond the depth of the weld, "A".

The shoulder 150 may be of various shapes. For example, the shoulder 150 and the outer protrusion 106 may include opposing recesses 152 formed therein, as shown in FIGS. 14 and 15, for receiving excess material (flash) formed during the weld. FIG. 16 depicts an arrangement where the outer protrusion 106 includes a lip 154 extending outside the opposing shoulder 150 for aiding in the alignment of the tube 22 and outer flange 14. As shown in FIGS. 14–16, the shoulder 150 and outer protrusion 106 may be supported by ribs 158.

Figure 18:
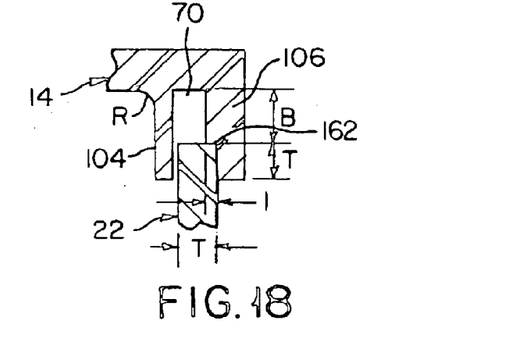
FIG. 18 is a cross-sectional view of a fifth alternative arrangement of the tube and fuel filler neck before welding.
Figure 19:
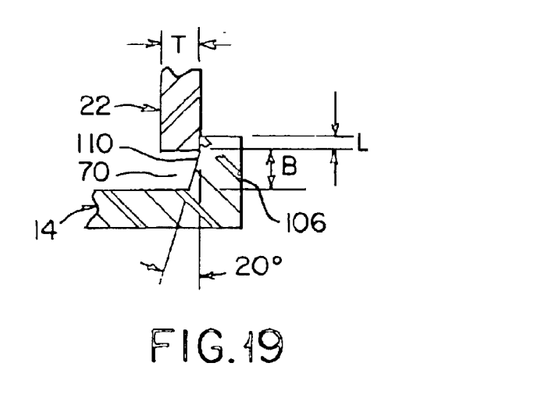
FIG. 19 is a cross-sectional view of a sixth alternative arrangement of the tube and fuel filler neck before welding.

FIGS. 17–19 depict arrangements where the weld is formed along only one of the inner and outer surfaces of a straight-walled tube 22. While FIGS. 17–19 depict the weld as being formed on the outer surface of the tube 22, it will be appreciated that the weld may alternatively be formed on the inner surface. FIG. 17 depicts an arrangement where the outer surface of the tube 22 is configured with a first shoulder 160 recessed from a distal end of the tube 22 by a distance equal to the thickness "T" of the tube 22. The distal end of the tube 22 is preferably separated from the end of the recess 70 by a distance equal to the thickness "T" of the tube 22, and is preferably offset from the outer protrusion 106 by an offset distance "G" of about 0.002 inches. The distal end of the tube 22 aids in the alignment of the tube 22 and outer funnel 14 during the welding process. The depth of the weld, as indicated at "B", is the distance between the first shoulder 160 and a shoulder 150 formed on the outer surface of the tube 22. The depth of the weld "B" may be between about 1×T to about 2×T, and more preferably about 1.5T, and may be increased or decreased depending on the required strength of the weld. The interference between the tube 22 and the outer funnel 14, indicated at "i", may be between about 0.005 inches to about 0.025 inches, and preferably between about 0.01 inches to about 0.02 inches. The shoulder 150 and outer protrusion 106 may be supported by ribs 158.

FIG. 18 depicts an arrangement where the outer protrusion 106 is configured with a first shoulder 162 disposed at a distance from the bottom surface of the recess 70 to establish the depth of the weld "B". The depth of the weld "B" may be between about 1×T to about 2×T, and more preferably about 1.5T, and may be increased or decreased depending on the required strength of the weld. The first shoulder 162 is preferably offset from a distal end of the outer protrusion 106 by a distance equal to the thickness "T" of the tube 22, thus allowing the outer protrusion 106 to aid in the alignment of the tube 22 and outer funnel 14 during the welding process. The interference between the tube 22 and the outer funnel 14, indicated at "i", may be between about 0.005 inches to about 0.025 inches, and preferably between about 0.01 inches to about 0.02 inches. The inner protrusion 104 is offset from the inner surface of the tube 22.

FIG. 19 depicts an arrangement wherein the inner surface 110 of the outer protrusion 106 is angled by about 20 degrees relative to the outer surface of the tube 22. The angled inner surface 110 of the outer protrusion 106 has a height that establishes the depth of the weld "B". The depth of the weld "B" may be between about 1×T to about 2×T, and more preferably about 1.5×T, and may be increased or decreased depending on the required strength of the weld. The angled inner surface 110 is preferably offset from the distal end of the outer protrusion 106 by a distance "L", which may be between about 0.020 inches to about 0.040 inches, thus allowing the distal end of the outer protrusion 106 to aid in the alignment of the tube 22 and outer funnel 14 during the welding process.

The fuel fill system 10 of the present invention includes a fuel filler neck 12 wherein the joints 16 between the outer funnel 14 and the one or more components 18 are formed by a plastic to plastic weld. Advantageously, the plastic to plastic weld provides a permanent, seamless, and vapor permeation resistant joint. As a result, the present invention reduces the escape of fuel vapor from the fuel fill system to levels below that previously possible with fuel fill systems of the prior art, which use press-fit arrangements and mechanical fasteners (e.g., hose clamps) to form the joints between the various components and the outer funnel. In addition, it has been surprisingly found that the welded joints of the present invention can be made electrically conductive, thus allowing the system to be commonly grounded for dissipating any static electricity generated during the fueling process.

A number of embodiments of the present invention have been described. Nevertheless, it will be understood that various modifications may be made without departing from the spirit and scope of the invention. Accordingly, other embodiments are within the scope of the following claims.

What is claimed is:

1. A fuel fill system comprising:
   an outer funnel formed from a thermoplastic material;
   a component formed from a thermoplastic material and in fluid communication with the outer funnel via a joint, wherein the outer funnel is welded to the component to form the joint, the component being selected from at least one of a flange, a tube, and a vapor recirculation fitting;
   an inner funnel disposed within the outer funnel and secured within the outer funnel by the flange, the flange being welded to the outer funnel; and
   a means for preventing axial rotation of the inner funnel within the outer funnel.

2. The fuel fill system of claim 1, wherein the weld is formed by at least one of spin welding, hot plate welding, laser welding, vibration welding, and ultrasonic welding.

3. The fuel fill system of claim 1, wherein the component is a tube, and the fuel fill system further comprises:
   a flange formed from a thermoplastic material and in fluid communication with the outer funnel via a second joint, wherein the outer funnel is welded to the flange to form the second joint.

4. The fuel fill system of claim 3, further comprising:
   a vapor recirculation fining formed from a thermoplastic material and in fluid communication with the outer funnel via a third joint, wherein the outer funnel is welded to the vapor recirculation fitting to form the third joint.

5. The fuel fill system of claim 4, wherein the weld is formed by at least one of: spin welding, hot plate welding, laser welding, vibration welding, and ultrasonic welding.

6. The fuel fill system of claim 1, wherein the means for preventing axial rotation includes a protrusion extending from one of the inner funnel and the outer funnel, the protrusion being received in a recess disposed in the other of the inner funnel and the outer funnel.

7. The fuel fill system of claim 1, further comprising:
   a removable cap disposed on the flange for sealing the fuel fill system.

8. The fuel fill system of claim 1, wherein the outer funnel includes a cylindrical protrusion extending therefrom, the weld being formed on an outer circumference of the cylindrical protrusion.

9. The fuel fill system of claim 1, wherein the outer funnel includes a cylindrical protrusion extending therefrom, the weld being formed on an inner circumference of the cylindrical protrusion.

10. The fuel fill system of claim 1, wherein the outer funnel includes an annular recess disposed therein, the annular recess being formed by opposing surfaces, and the weld being formed on the opposing surfaces.

11. The fuel fill system of claim 1, wherein the component includes a cylindrical protrusion extending therefrom, the weld being formed on an outer circumference of the cylindrical protrusion.

12. The fuel fill system of claim 1, wherein the component includes a cylindrical protrusion extending therefrom, the weld being formed on an inner circumference of the cylindrical protrusion.

13. The fuel fill system of claim 1, wherein the component includes an annular recess disposed therein, the annular recess being formed by opposing surfaces, and the weld being formed on the opposing surfaces.

14. The fuel fill system of claim 1, wherein the outer funnel includes an alignment feature disposed thereon, the alignment feature cooperating with an alignment feature on the component to ensure proper alignment of the component relative to the outer funnel.

15. The fuel fill system of claim 1, wherein the plastic outer funnel is formed from an electrically conductive thermoplastic material.

16. A method of assembling a fuel fill system comprising:

a providing a thermoplastic outer funnel;

welding a thermoplastic component to the outer funnel to provide a joint between the outer funnel and the component, the component being selected from at least one of a flange, a tube, and a vapor recirculation fitting;

inserting an inner funnel within the outer funnel;

welding the flange to the outer funnel to secure the inner funnel within the outer funnel; and preventing axial rotation of the inner funnel within the outer funnel.

17. The method of claim 16, wherein the welding includes at least one of: spin welding, hot plate welding, laser welding, vibration welding, and ultrasonic welding.

18. The method of claim 16, wherein the component is a tube, and the method further comprises:

welding a flange formed from a thermoplastic material to the outer funnel to provide a joint between the outer funnel and the flange.

19. The method of claim 18, further comprising:

welding a vapor recirculation fitting formed from a thermoplastic material to the outer funnel to provide a joint between the outer funnel and the vapor recirculation fitting.

20. The method of claim 19, wherein each welding includes at least one of: spin welding, hot plate welding, laser welding, vibration welding, and ultrasonic welding.

21. The method of claim 16, wherein the means for preventing axial rotation includes a protrusion extending from one of the inner funnel and the outer funnel, the protrusion being received in a recess disposed in the other of the inner funnel and the outer funnel.

22. The method of claim 16, further comprising:

inserting a removable cap on the flange for sealing the fuel fill system.

23. The method of claim 16, wherein the plastic outer funnel is formed from an electrically conductive thermoplastic material.

24. The method of claim 16, wherein the welding includes:

generating heat by relative motion of between the outer funnel and the component.

25. The method of claim 16, wherein the welding includes:

applying an external source of heat to surfaces to be welded on the outer funnel and the component.

* * * * *